United States Patent [19]
Maughmer et al.

[11] 3,856,403
[45] Dec. 24, 1974

[54] VELOCITY BIASED LASER VELOCIMETER

[75] Inventors: Robert W. Maughmer, Thousand Oaks; John R. Yamamoto, Sherman Oaks, both of Calif.

[73] Assignee: Litton Systems, Inc., Beverly Hills, Calif.

[22] Filed: Mar. 9, 1973

[21] Appl. No.: 339,685

Related U.S. Application Data

[63] Continuation of Ser. No. 116,918, Feb. 19, 1971, abandoned.

[52] U.S. Cl. .................................. 356/28, 250/233
[51] Int. Cl. ............................................. G01p 3/36
[58] Field of Search ....................... 356/28; 250/233

[56] References Cited
UNITED STATES PATENTS

| | | | |
|---|---|---|---|
| 2,772,479 | 12/1956 | Doyle | 356/28 |
| 3,432,237 | 3/1969 | Flower et al. | 356/28 |
| 3,511,150 | 5/1970 | Whitney et al. | 356/28 |
| 3,737,233 | 6/1973 | Blau et al. | 356/28 |

Primary Examiner—Maynard R. Wilbur
Assistant Examiner—S. C. Buczinski
Attorney, Agent, or Firm—Harold E. Gillmann

[57] ABSTRACT

A laser velocimeter system for measuring the relative velocity between a carrier and a light scattering source illuminated by laser light. Light energy reflected from the laser illuminated scattering source is utilized to derive a signal indicative of the relative velocity. The reflected energy passes through a moving optical grating and is received by a light sensitive detector. The output signal of the detector is modulated by the effect of the grating moving across the speckle field of the reflected laser light, with the motion of the grating providing a velocity bias to the system.

10 Claims, 9 Drawing Figures

Patented Dec. 24, 1974

ROBERT W. MAUGHMER
JOHN R. YAMAMOTO
INVENTOR.

BY

ATTORNEY

ROBERT W. MAUGHMER
JOHN R. YAMAMOTO
INVENTOR.

BY

ATTORNEY

ROBERT W. MAUGHMER
JOHN R. YAMAMOTO
INVENTOR.

BY

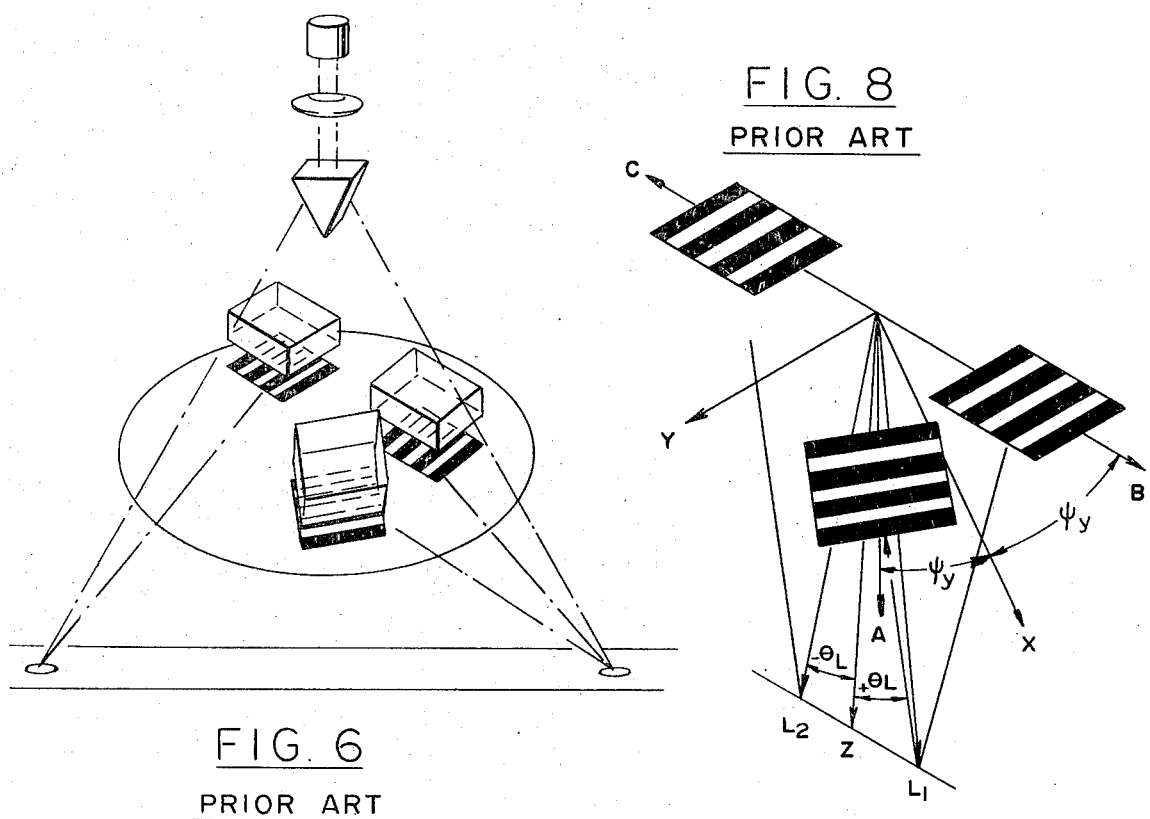
FIG. 8
PRIOR ART
FIG. 6
PRIOR ART
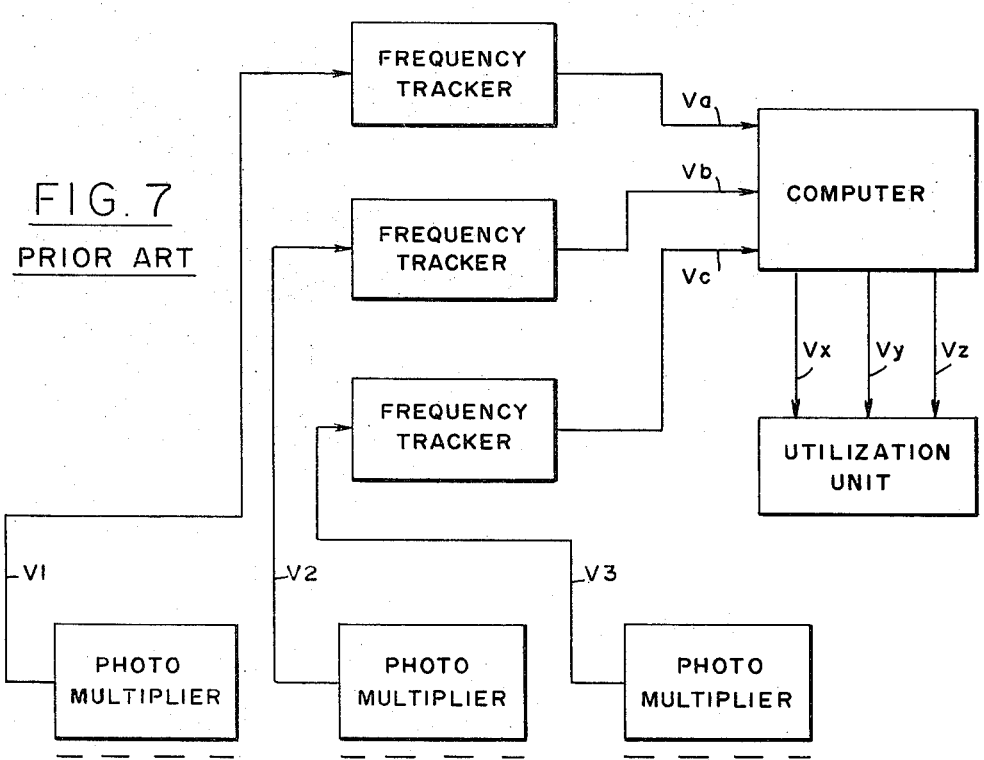
FIG. 7
PRIOR ART

VELOCITY BIASED LASER VELOCIMETER

This is a continuation, of application Ser. No. 116,918, filed Feb. 19, 1971, now abandoned.

This invention relates generally to laser velocimeters and particularly to a laser velocimeter system including means for providing a velocity bias so that the measured output characteristic of the primary velocity sensor is non-zero, at zero velocity.

The advantages of the velocity biased laser velocimeter in accordance with the principles of this invention may be better understood after examining the operation of a prior art unbiased laser velocimeter. In a single sensor prior art system such as that described in U.S. Pat. No. 3,432,237 to Flower, et al., a continuous wave laser illuminates a small area on an adjacent surface whose velocity is to be determined relative to the sensor of the velocimeter unit. Some fraction of the incident laser energy is reflected or back scattered by the illuminated area of surface and, because of the coherence of the incident laser light for stationary conditions, the phase relationship between the light striking any two elements of the surface is preserved in time. All illuminated surface elements thus re-radiate (back scatter) a fraction of the incident energy with time stationary phase relationships. The intensity at any point in the field of back-scattered light is the vector sum of the contribution for each scattering element in the illuminated area. Points where the contributions are generally in phase are bright, while points where they are out of phase are dark. The resulting pattern in space is random because of the random nature of the scatterers in the illuminated area. This resulting pattern is sometimes referred to as a "speckle" pattern.

If the illuminated surface is displaced relative to the laser beam some of the scattering elements are lost from the field of illumination and new ones are gained. This results in the reflected light pattern changing in a continuous manner to a new but statistically similar pattern. Movement within the pattern from this effect shows no preferred direction.

Displacement of the laser beam relative to the surface also causes a shift in the position of the pattern as a result of the change in the relative phase of the light energy striking the scatterers in the illuminated area. This shift is predictable and provides the basis for laser velocimeter systems.

When a light sensitive detector having a grating with regularly spaced opaque and transparent lines is placed in the path of the reflected laser energy, motion of the speckle pattern relative to the detector results in modulation of the output signal of the detector. The opaque lines interrupt the reflected light energy, converting the detected motion of each spot in the speckle field into a series of pulses. The net effect of a relative motion of the velocimeter sensor and the scattering source is the sum of many such pulse trains, since many light spots cross the receiving aperture of the detector simultaneously. For a given relative velocity, the pulse trains all have the same frequency whether or not they are phase correlated. The output of the light sensitive detector thus includes a band of frequencies centered about the frequency corresponding to the velocity of a single spot. Hence, relative motion of the pattern with respect to the optical grating results in a modulation of the output signal of the detector, the frequency of the modulation being a function of the relative velocity of the detector with respect to the scattering source.

Single sensor velocimeters of the type described above have been used in applications where the velocity to be measured lies in a single fixed direction and where relative geometrical orientations are stable and known. For example, single sensor velocimeters of the above described type are used commercially to measure velocity of materials being processed by rolling mills.

A multisensor laser velocimeter for use in applications where the geometrical relationships between the velocimeter unit and the surface whose velocity is to be measured are not stable and unchanging, is disclosed in copending patent application Ser. No. 73,305, now U.S. Pat. No. 3,711,200, filed Sept. 18, 1970, by Robert W. Maughmer and assigned to the assignee hereof, which is hereby incorporated by reference. Multisensor laser velocimeters may be used for example, in survey applications where it is desired to determine the velocity of a land vehicle and to use the velocity so determined to up-date an inertial navigation system. In such applications the velocimeter must be able to provide accurate velocity measurements in each of three orthogonal coordinates despite static or dynamic displacements of the velocimeter unit from a fixed orientation.

In both single and multisensor laser velocimeters of the prior art, a zero relative velocity between the velocimeter sensors and the laser illuminated surface results in a zero frequency (D.C.) modulation of the sensor output signals. This follows from the fact that when the relative velocity is zero the speckle pattern is motionless and no light spots move across the grating in front of the detector. Moreover, in the prior art, the output of each sensor is modulated by the effective periodic interruption by the grating of the light in each bright spot of the speckled pattern without regard to the direction of the relative motion. The modulation frequency is the same for a given absolute value of the velocity in a selected linear direction. Thus, the sensor cannot detect whether the motion is positive or negative along a coordinate direction in which velocity is being measured.

If the velocimeter is mounted on a vehicle crossing rugged terrain it will be subject to undesired translational and rotational motions which can result in occasional short term zero velocities or changes in the direction of motion along an axis in which velocity is being measured. Without the ability to sense the direction of motion, the velocimeter is prone to errors which may be described as rectification of the measured velocity, and the absolute values of actual negative velocities will be detected as positive velocities. Additionally, the inability of the system to sense positively a zero velocity means that there is no convenient way to adjust the system to a zero reference. A further source of error in prior art laser velocimeters is thermally induced changes in the dimensions of the grating. Such fluctuations cause changes in the scale factor which is the relation of the relative velocity between the illuminated area of the target and the velocimeter to the frequency output of the velocimeter.

Laser velocimeter systems typically employ a frequency tracker which generates an output signal having a frequency indicative of the frequency of the modulation impressed on the output of the sensor by the motion of the speckle pattern with respect to the grating. As the frequency tracker generally has a limited range of operating frequencies, it places definite operational restrictions on the use of the laser velocimeter. It is also characteristic of the output signal of prior art laser velocimeters that the bandwidth of the fundamental modulation frequency and the separation between the harmonics are proportional to the velocity being detected. As the velocity is decreased the harmonics tend to cluster at zero frequency with consequent difficulty in accurately determining the separations of selected side lobes of the frequency spectrum which are indicative of the velocity being measured. This phenomenon imposes severe limits on the dynamic range and accuracy achievable by the system.

Velocity biasing of the laser velocimeter according to this invention reduces or eliminates the difficulties encountered by the prior art as described above.

Therefore, it is an object of this invention to provide a velocity biased velocimeter for measuring the velocity of the velocimeter sensor with respect to a scattering source.

It is a further object of the invention to provide an improved laser velocimeter for measuring the velocity between a carrier upon which the unit is mounted and a surface, the unit having the capability of detecting the sign of the velocity being measured.

Another object of the invention is to provide a laser velocimeter system with an extended velocity range and improved accuracy.

In another object of the invention is a laser velocimeter which is capable of accurately determining relatively small velocities, zero velocity and negative velocities.

It is also an object to provide a laser velocimeter in which system bias errors and changes in the scale factor can be easily detected.

These and other objects are achieved in a laser velocimeter which, according to the principles of the invention, is velocity biased. That is, the output frequency of the primary detector is non-zero at all velocities in the range to be measured.

In an illustrative embodiment of the invention, the velocity bias is provided by continuously moving the light interrupting grating in the direction of the velocity to be measured. A laser transmitter provides a beam for illuminating a portion of the surface. A fraction of the illuminating light energy is reflected and received by a photo detector at the velocimeter unit. Prior to impinging upon the detector, the light energy is modulated by the grating which moves at a predetermined velocity with respect to the photo detector. The output signal from the photo detector may be applied to a frequency tracker which generates an output signal whose frequency is indicative of the modulation impressed on the laser signal by the moving optical grating. Hence, the output of the tracker is a function of the relative motion between the velocimeter and the surface, which may be the terrain across which the unit is transported, and of the motion of the grating itself with respect to the photo detector.

The grating may be formed on a disc or a drum which is rotated so that the lines of the grating cross the aperture of the detector at a predetermined rate. Alternatively, the grating may be formed on an endless loop of a flexible material which is transported across the detector aperture by means of a system of rollers.

The invention will be better understood from the following description taken in conjunction with the accompanying drawings which are for purposes of illustration and description only and do not define the limitations of the invention as set forth in the appended claims. In the drawings:

FIG. 6 is a block diagram and front elevational view of a transmitter and a portion of the receiver section of prior art device;

FIG. 7 is a block diagram of the receiver and data processing section of a prior art device;

FIG. 8 is a diagram showing the geometrical relationships between the various optical gratings and the transmitted laser beams for clarifying the derivation of velocity terms along each of three orthogonal coordinates.

Figure 1:
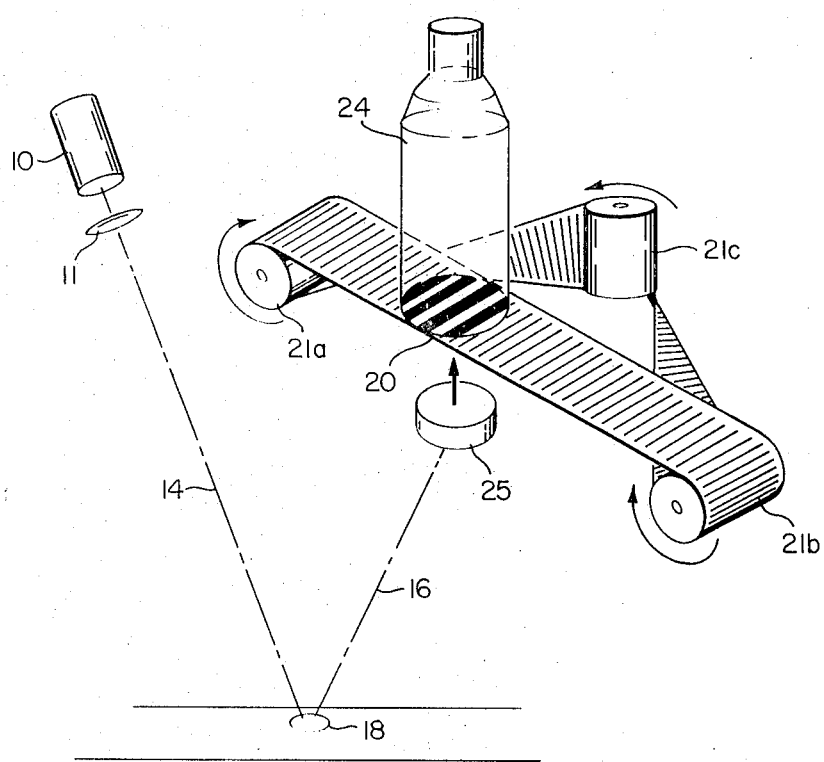
FIG. 1 is a diagram of a portion of the receiver section of a laser velocimeter embodying the invention, in which the grating is on a flexible belt.

In the velocity biased velocimeter system shown in diagrammatic form in FIG. 1, a continuous wave laser transmitter 10 transmits a beam to collimating lens 11. Collimating lens 11 transforms the coherent beam from laser transmitter 10 into a collimated coherent beam of light 14.

Use of a collimating lens is optional. Its use, however, does afford the advantage of reducing the sensitivity of the velocimeter to vertical movements of the carrier. If a collimated beam is used, the velocity of the speckle pattern across the grating has a one-to-one correspondence with the velocity of the carrier with respect to the illuminated surface. A one-to-one correspondence does not exist if the beam is not collimated.

The light energy from laser beam 14 is reflected from a plurality of discrete scatters comprising a portion of the terrain 18 illuminated by the beam. A fraction of this reflected energy returns to the velocimeter unit where it passes through an optical grating 20 on an endless loop of flexible belt mounted on rollers 21a, 21b and 21c. The grating 20 comprises elongated bars or segments having alternating transparent and opaque light transmission characteristics. Reflected laser light energy from beam 14 which passes through optical grating 20 impinges upon the face of a light sensitive detector 24. An interference filter 25 may be placed in front of the grating as a narrow band pass filer whereby signals in a frequency range centered about the frequency of the laser beam are passed, while other signals which would reduce the efficiency of the receiver section are attenuated. The photo detector 24 provides an output signal $V_1$ which is a function of the relative intensity of the light energy received.

Figure 4A:
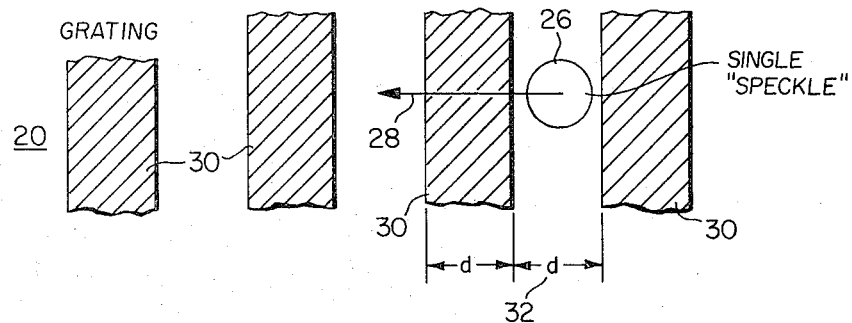
FIG. 4a is an enlarged fragmentary view of a portion of an optical grating used in the systems of FIGS. 1, 2 and 3.

Although the composite signal produced by a light sensitive detector, such as detector 24, is a summation of the effect of many small discrete bright spots in the speckle field, the response of the system may be profitably analyzed with respect to a single bright spot. FIG. 4a shows a single speckle (high intensity light spot) 26 which is moving at a velocity V relative to a portion of the grating 20 in the direction normal to the lines of the grating as indicated by arrow 28. This motion of the light spot 26 may be induced either by a movement of the reflecting surface relative to the velocimeter or, as would be the case for a velocimeter mounted on a vehicle for surveying applications, by the motion of the transmitter and the receiver with respect to the terrain.

Figure 4B:
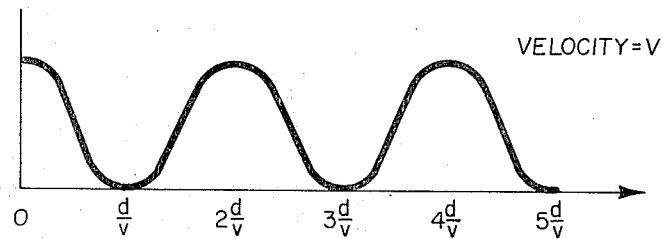
FIG. 4b is a diagram of voltage amplitude versus time for the output signal from a photo detector in a system of the type illustrated in FIGS. 1, 2 and 3.

In accordance with the principles of the invention, the relative motion V of spot 26 and grating 20 includes a component resulting from the motion of the grating 20 which preferably is in a direction normal to the lines of the grating and opposite to the direction of arrow 28. The relative motion between the spot 26 and the velocimeter grating causes the output signal of the photo detector 24 due to spot 26 to be periodically interrupted by the alternating opaque segments 30 and clear segments 32 of grating 20. The amplitude variation or modulation of the signal is depicted in FIG. 4b which displays the relationship between the separation of the segments of the optical grating designated in the drawing as dimension d, the relative velocity of the light spot 26 normal to the lines of the grating, and the frequency of the signal. The frequency of the modulated signal is a function of the relative velocity between the grating 20 and the illuminated section of the terrain which reflects the speckle pattern to the detector.

As the vehicle supporting the velocimeter unit moves across the surface of the terrain at a constant speed it may be considered that the reflected energy from each single scatterer is modulated at a constant frequency by the grating 20. However, it should be understood that the relationship between the phase angles of the light reflected by the different discrete scatterers is random and that the overall speckle pattern is changing as portions of the terrain leave the illuminated section and new portions of terrain come within the illuminated area.

Figure 5:
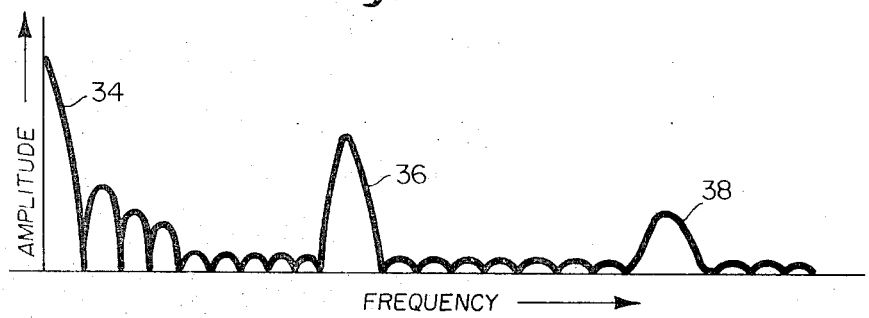
FIG. 5 is a diagram of a portion of the output signal spectrum of a photo detector in systems of the type illustrated by FIGS. 1, 2 and 3.

The resulting spectrum of the signal, i.e., the relative power at given frequencies in the output of the photo detector 24, may be considered for purposes of approximation as a series of discrete spectral side lobes, such as lobes 34, 36 and 38 of FIG. 5. The frequency separation of these side lobes is a function of the velocity of the optical grating 20 with respect to the speckle pattern impinging thereon. If the grating velocity is constant, the change in frequency separation may be considered a function of the relative velocity of the photo detector 24 with respect to the terrain. The voltage amplitude of these lobes approximately follows a sin x/x relationship. In FIG. 5 it is noted that the first and largest spectral lobe is centered at zero frequency (D.C.) with the spacing between the centers of adjacent lobes being a function of the relative velocity as discussed.

The output signal from detector 24 may be applied to an input circuit of a frequency tracker unit, not shown, which is mechanized to track the main frequency of a selected spectral side lobe, for example, lobe 36 of FIG. 5. The output signal of the frequency tracker unit is a voltage wave form at a frequency which is indicative of the main frequency of the spectral side lobe being tracked and hence indicative of the frequency of modulation of the reflected light beam. Numerous well-known frequency tracker units such as those utilized in doppler radar processors for example, may be utilized to perform the above described function.

In U.S. Pat. No. 3,711,200 a multisensor laser velocimeter with fixed gratings is described and vehicle referenced velocities are derived as follows:

$$V_x = (V_a + V_c)/2 \cos \psi_y$$
$$V_y = (V_a + V_b)/2 \sin \psi_y$$
$$V_z = (V_c + V_b)/2 \tan L \cos \psi_y$$

If the multisensor laser velocimeter of U.S. Pat. No. 3,711,200 is equipped with moving gratings having an effective velocity $V_g$ with respect to the photo detector, $V_g$ is added to the expressions for $V_a$, $V_b$, and $V_c$. $V_y$ and $V_z$ are unchanged while $V_x$ becomes:

$$V_x = (V_a + V_c + 2V_g)/2 \cos \psi_y$$

The objects of the invention are achieved in such a system by adjusting $V_g$ so that $$V_a \geq 0$$
$$V_b \geq 0$$
$$V_c \geq 0$$

Velocity biasing as described prevents errors due to rectification of velocities, and permits the laser velocimeter to operate over a more extended range of velocities than that dictated by a limited range of the frequency tracker unit in a system without velocity biasing. By varying the grating velocity, the velocity biased laser velocimeter can accommodate a velocity range limited only by the mechanical characteristics of the grating transport apparatus. The desired grating velocity is inversely proportional to the actual relative velocity between the target and the velocimeter.

The velocity biased laser velocimeter also permits convenient determination of the scale factors and residual biases of the system. During a stop period when the relative velocity being measured is known to be zero, the scale factor and residual bias may both be obtained by taking two measurements from each sensor. The calibration procedure requires the following calculations. (These and other calculations mentioned hereafter may be rapidly performed by conventional computing devices, i.e. analog or digital computers.)

$$V_{a1} = V_{bias} + KV_{g1}$$
$$V_{a2} = V_{bias} + KV_{g2}$$

where $K$ is the scale factor and $V_{bias}$ is the residual bias of the system, $V_{g1}$ and $V_{g2}$ are two different grating velocities, It follows that $$K = (V_{a2} - V_{a1})/(V_{g2} - V_{g1})$$

and $$V_{bias} = (V_{a2} + V_{a1})/2K (V_{g2} + V_{g1})$$

Periodic determination of $V_{bias}$ and $K$ thus permits these sources of error to be virtually eliminated from the system in operation.

The velocity bias produced by the motion of the grating also maintains a more easily measurable separation between the harmonics of the detector output spectrum at low values of the velocity being measured. This is also because the motion of the grating itself modulates the detector output at zero velocity, so that the harmonics do not degenerate over the expected range of operation.

The effect of velocity biasing according to the invention may be appreciated from the following mathematical demonstration. Referring to FIG. 4a, $V$ is the velocity of a light spot in the speckle pattern with respect to the detector, and $T$ is the time required for the spot to travel a line pair width, which is equal to $2d$:

$$T = 2d/(V_g \pm V)$$

The modulation frequency is:

$$F = 1/T = (V_g \pm V)/2d$$

By maintaining $|V_g| > |V|$, all ambiguity associated with changes in the sign of $V$ are eliminated.

Figure 2:
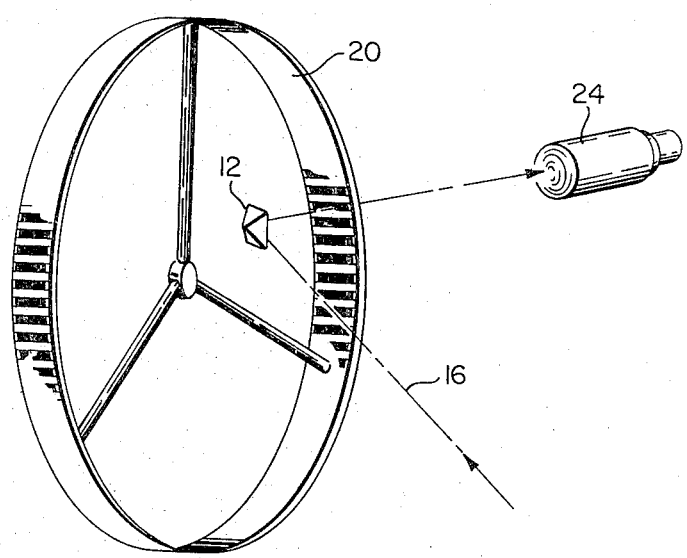
FIG. 2 is a diagram of a portion of the receiver section of a laser velocimeter embodying the invention, in which the grating is on a rotating drum.
Figure 3:
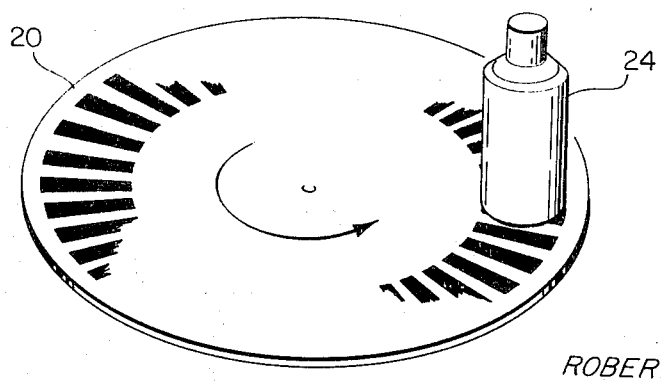
FIG. 3 is a diagram of a portion of the receiver section of a laser velocimeter embodying the invention, in which the grating is on a rotating disc.

FIG. 2 depicts a portion of a receiver section of a laser velocimeter embodying the invention, in which the moving grating 20 is mounted on a rotating transparent drum with the lines of the grating moving across the aperture of detector 24 in a direction normal to their length. A beam bending prism 12 is positioned to direct the reflected laser beam 16 through grating 20 to detector 24.

FIG. 4 shows an illustrative arrangement according to the invention in which the grating 20 is mounted on a rotating transparent disc positioned to move the lines of grating across the receiving aperture of detector 24.

FIGS. 6, 7 and 8 are diagrams of the prior art transmitter and receiver disclosed in U.S. Pat. No. 3,711,200.

Although the invention has been described with reference to a number of specific illustrative embodiments, those skilled in the art may make variations and modifications without departing from its scope and spirit.

What is claimed is:

1. An apparatus for measuring the relative three-dimensional vectorial velocity in a coordinate system between a moving object mounted thereto and an adjacent surface, said apparatus comprising:
    illuminating means developing a plurality of coherent beams of light for illuminating separate portions of said surface with light energy;
    means for receiving light energy reflected from said surface at three different angles of reflection, said last-mentioned receiving means having three functionally separate signal processing channels;
    three optical gratings disposed between said surface and said receiving means with each functionally separate grating modulating the reflected light energy processed by a corresponding one of said separate channels, a first one of said optical gratings effectively located at a different point in the coordinate system from said second and third ones of said optical gratings, said second and third gratings having a different orientation with respect to one another in the coordinate system, each said optical grating having alternate transparent and opaque lines extending in a direction normal to a corresponding velocity component $V_a$, $V_b$, and $V_c$ to be measured in predetermined directions $a$, $b$, and $c$, said opaque lines interrupting the reflected light energy points so that said receiving means detects the resulting motion of each of the interrupted energy points and converts the energy points into pulses for a signal representative of the relative velocity components $V_a$, $V_b$, and $V_c$ between the moving object and the adjacent surface, each said optical grating adapted for continuous motion parallel to the direction of the velocity component at an effective velocity $V_g$ relative to said receiving means;
    $V_g$ being selectively adjusted when said object has zero relative velocity with respect to said surface so that $V_a \geq O$, $V_b \geq O$, and $V_c \geq O$; and
    means coupled to said receiving means for deriving signals representative of the three-dimensional vectorial velocity between said moving object and said surface in a predetermined coordinate system.

2. The device as claimed in claim 1 wherein at least one said optical grating is a flexible transparent loop.

3. The device as claimed in claim 2 and further including means for continuously transporting the grating at a predetermined velocity in a plane fixed with respect to the detector means.

4. The device as claimed in claim 1 wherein at least one said grating is a rigid transparent disc.

5. The device as claimed in claim 4 and further including means for rotating the disc at a predetermined velocity in a plane fixed with respect to the receiving means.

6. The device as claimed in claim 1 wherein at least one said grating is a rigid transparent drum.

7. The device as claimed in claim 6 and further including means for rotating the drum at a predetermined velocity in a plane fixed with respect to the receiving means.

8. The device as claimed in claim 1 wherein the receiving means includes a light detector device for converting light intensity into a voltage signal representative thereof.

9. The device as claimed in claim 1 where each said optical grating is effectively located at the same point as the illuminating means.

10. An apparatus for measuring the relative three-dimensional vectorial velocity in a coordinate system between a moving object mounted thereto and an adjacent surface, said apparatus comprising:
    illuminating means developing a plurality of coherent beams of light for illuminating separate portions of said surface with light energy;
    means for receiving light energy reflected from said surface at three different angles of reflection, said last-mentioned receiving means having three functionally separate signal processing channels;
    three coplanar optical gratings disposed between said surface and said receiving means with each functionally separate grating modulating the reflected light energy processed by a corresponding one of said separate channels, a first one of said optical gratings effectively located at a different point in the coordinate system from said second and third ones of said optical gratings, said second and third gratings having a different orientation with respect to one another in the coordinate system, each said optical grating having alternate transparent and opaque lines extending in a direction normal to a corresponding velocity component $V_a$, $V_b$, and $V_c$ to be measured in predetermined directions $a$, $b$, and $c$, said opaque lines interrupting the reflected light energy points so that said receiving means detects the resulting motion of each of the interrupted energy points and converts the energy points into pulses for a signal representative of the relative velocity components $V_a$, $V_b$, and $V_c$ and between the moving object and the adjacent surface, each said optical grating adapted for continuous motion parallel to the direction of the corresponding velocity component at an effective velocity $V_g$ relative to said receiving means;

$V_g$ being selectively adjusted so that $V_a \geq 0$, $V_b \geq 0$, and $V_c \geq 0$; and means coupled to said receiving means for deriving signals representative of the three-dimensional vectorial velocity between said moving object and said surface in a predetermined coordinate system having three orthogonal coordinates $x$, $y$ and $z$, the relative velocity components $V_x$, $V_y$ and $V_z$ being derived by the moving object referenced velocity formulae $$V_x = (V_a + V_c + 2V_g)/2 \cos \psi y$$
$$V_y = (V_a - V_b)/2 \sin \psi y$$
$$V_z = (V_c - V_b)/2 \tan \theta_L \cos \psi y$$

where the $x$ and $y$ axes are in the plane of said optical gratings, where $\psi y$ is equal to the angle between the a and $x$ coordinates and between the $b$ and the $x$ coordinates and where each line segment depicting the outer of one of a selected pair of coherent beams forms an angle $\psi_L$ with the $z$ axis, the angle $\theta_L$ lying in the $xz$ plane.

* * * * *